(12) United States Patent
Earnshaw et al.

(10) Patent No.: US 11,256,513 B2
(45) Date of Patent: Feb. 22, 2022

(54) INDIRECT CONTROL FLOW INSTRUCTIONS AND INHIBITING DATA VALUE SPECULATION

(71) Applicant: Arm Limited, Cambridge (GB)

(72) Inventors: Richard William Earnshaw, Fulbourn (GB); Kristof Evariste Georges Beyls, Ghent (BE); James Greenhalgh, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/043,921

(22) PCT Filed: Mar. 14, 2019

(86) PCT No.: PCT/GB2019/050722
§ 371 (c)(1),
(2) Date: Sep. 30, 2020

(87) PCT Pub. No.: WO2019/207278
PCT Pub. Date: Oct. 31, 2019

(65) Prior Publication Data
US 2021/0149674 A1    May 20, 2021

(30) Foreign Application Priority Data

Apr. 24, 2018 (GB) .................................... 1806638
Jul. 6, 2018 (GB) .................................... 1811151

(51) Int. Cl.
*G06F 9/38* (2018.01)
*G06F 9/30* (2018.01)
(Continued)

(52) U.S. Cl.
CPC .......... *G06F 9/3842* (2013.01); *G06F 9/3005* (2013.01); *G06F 9/30061* (2013.01);
(Continued)

(58) Field of Classification Search
CPC .......................... G06F 9/3842; G06F 9/30061
See application file for complete search history.

(56) References Cited

U.S. PATENT DOCUMENTS 6,279,106 B1   8/2001 Roberts
7,937,569 B1   5/2011 Sander et al.
(Continued)

FOREIGN PATENT DOCUMENTS

GB         2 458 556        9/2009

OTHER PUBLICATIONS

X86 Programming III CSE 351, 2016, University of Washington, 39 pages, [retrieved from the internet on Jun. 5, 2021], retrieved from URL <courses.cs.washington.edu/courses/cse351/16au/lectures/CSE351-L10-x86-III_16au.pdf> (Year: 2016).*

(Continued)

*Primary Examiner* — Jyoti Mehta
(74) *Attorney, Agent, or Firm* — Nixon & Vanderhye P.C.

(57) ABSTRACT

There is provided an apparatus that includes input circuitry to receive input data and output circuitry to output a sequence of instructions to be executed by data processing circuitry. Generation circuitry performs a generation process to generate the sequence of instructions using the input data. The sequence of instructions comprises an indirect control flow instruction having a field that indicates where a target of the indirect control flow instruction is stored. The generation process causes at least one of the instructions in the sequence of instructions to store a state of control flow speculation after execution of the indirect control flow instruction. The at least one of the instructions in the sequence of instructions that stores the state of control flow speculation is inhibited from being subject to data value speculation by the data processing circuitry.

17 Claims, 15 Drawing Sheets

```
switch (i)
{
   case 0: x = 2; ...; break;
   case 1: x = 3; ...; break;
   case 2: x = 5; ...; break;
   case 3: x = 7; ...; break;
}
```
900

```
switch(usemap(i, {0=>2, 1=>4, 2=>6, 3=>8}))
{
   //case 0:
      sstate &= -(i==0); x = 2; ...; break;
   //case 1:
      sstate &= -(i==1); x = 3; ...; break;
   //case 2:
      sstate &= -(i==2); x = 5; ...; break;
   //case 3:
      sstate &= -(i==3); x = 7; ...; break;
}
```
910
920

(51) Int. Cl.
G06F 12/14 (2006.01)
G06F 21/12 (2013.01)
G06F 21/55 (2013.01)
G06F 21/52 (2013.01)

(52) U.S. Cl.
CPC ........ G06F 9/30181 (2013.01); G06F 9/3844 (2013.01); G06F 12/14 (2013.01); G06F 21/125 (2013.01); G06F 21/52 (2013.01); G06F 21/556 (2013.01); G06F 9/3846 (2013.01)

(56) References Cited

U.S. PATENT DOCUMENTS

| | | | |
|---|---|---|---|
| 9,535,696 | B1 | 1/2017 | Gschwind et al. |
| 2003/0233643 | A1* | 12/2003 | Thompson ............ G06F 8/4452 717/161 |
| 2004/0172524 | A1 | 9/2004 | Hoogerbrugge |
| 2005/0013183 | A1 | 1/2005 | Southwell |
| 2012/0089824 | A1 | 4/2012 | Fukagawa |
| 2014/0258696 | A1 | 9/2014 | Srikantaiah |
| 2019/0114422 | A1 | 4/2019 | Johnson et al. |

OTHER PUBLICATIONS

Andrew Tanenbaum, Structured Computer Organization, 1984, Prentice-Hall, Second edition, 5 pages (Year: 1984).*
Arm Compiler armasm user guide, Mar. 14, 2018, arm, 6.10, 7 pages (Year: 2018).*
Pipeline Stalls, 2013, 12 pages, [retreived from the internet on Jun. 15, 2021], retrieved from URL <courses.cs.vt.edu/cs2506/Spring2013/Notes/L12.PipelineStalls.pdf> (Year: 2013).*
Combined Search and Examination Report for GB Application No. 1806638.1 dated Nov. 13, 2018, 8 pages.
Arm Limited, Arm® Compiler Version 6.10, armasm User Guide, Section 16.60 referenced in GB Combined Search and Examination Report, dated Jun. 14, 2018, 1796 pages.
U.S. Appl. No. 17/042,526, filed Sep. 28, 2020, Beyls et al.
U.S. Appl. No. 17/041,818, filed Sep. 25, 2020, Earnshaw et al.
Martin Abadi, et al., "Control-Flow Integrity", Principles, Implementations, and Applications, Proceedings of the 12$^{th}$ Conference on Computer and Communications Security, CCS05, Nov. 2005, accessed Dec. 21, 2018, 19 pages.
Jay Bharadwaj, et al., "Wavefront Scheduling: Path Based Data Representation and Scheduling of Subgraphs", Proceedings of the 32$^{nd}$ ACM/IEEE International Symposium on Microarchitecture, MICRO-32, Nov. 1999, 10 pages.
Richard Grisenthwaite, "Cache Speculation Side-channels", ARM, Whitepaper, Jan. 2018, accessed Dec. 21, 2018, 13 pages.
Resit Sendag, et al., "The Effect of Executing Mispredicted Load Instructions in a Speculative Multithreaded Architecture", Workshop on Multi-threaded Execution, Architecture and Compilation, Nov. 2002, accessed Dec. 21, 2018, 8 pages.
Combined Search and Examination Report for GB Application No. 1811151.8 dated Jan. 2, 2019, 12 pages.
Combined Search and Examination Report for GB Application No. 1811154.2 dated Jan. 2, 2019, 12 pages.
International Search Report and Written Opinion of the ISA for PCT/GB2019/050722 dated May 22, 2019, 16 pages.
International Search Report and Written Opinion of the ISA for PCT/GB2019/050666 dated May 16, 2019, 15 pages.
International Search Report and Written Opinion of the ISA for PCT/GB2019/050723 dated May 24, 2019, 16 pages.
Office Action dated Jul. 7, 2021 for U.S. Appl. No. 17/042,526, 36 pages.
"Implementing Procedure Calls" Feb. 18-22, 2013, retrieved from web.engr.oregonstate.edu/~walkiner/cs271-Wi13/slides/08-ProcedureCalls.pdf, 39 pages.

* cited by examiner

```
switch (i)
{
    case 0: x = 2; ...; break;
    case 1: x = 3; ...; break;
    case 2: x = 5; ...; break;
    case 3: x = 7; ...; break;
}
                        ~900
```

```
switch(usemap(i, {0=>2, 1=>4, 2=>6, 3=>8}))    ~910
{
    //case 0:
        sstate &= -(i==0); x = 2; ...; break;
    //case 1:
        sstate &= -(i==1); x = 3; ...; break;
    //case 2:
        sstate &= -(i==2); x = 5; ...; break;
    //case 3:
        sstate &= -(i==3); x = 7; ...; break;
}
                        ~920
```

FIG. 10a

```
switch (i)
{
    case 0:
    case 1: x = 3; break;
    case 2:
    case 3: x = 7; break;
}
...                     ~930
```

```
switch(usemap(i, {0=>3, 1=>3, 2=>6, 3=>6}))    ~940
{
    //case 0:
    //case 1:
        sstate &= -(i==0 | i==1); x = 3; break;
    //case 2:
    //case 3:
        sstate &= -(i==2 | i==3); x = 7; break;
}
...                     ~950
```

FIG. 10b person.getIncome() ──→
```
ldr x1, [thisptr, #vtable_offset]
ldr x1, [x1, #index_of(<pensioner_getIncome>)]
blr x1
```
                                    1310
                          1300

Fig. 14a person.getIncome() ──→
```
ldr x1, [thisptr, #vtable_offset]
ldr x1, [x1, #index_of(<VFUNC_VALIDATE_pensioner_getIncome>)]
blr x1
```

Fig. 14b

```
VFUNC_VALIDATE_pensioner_getIncome:
    ldr IP0, [thisptr, #vtable_offset]
    ldr IP0, [IP0, #index_of(< VFUNC_VALIDATE_pensioner_getIncome >)]
    adr IP1, VFUNC_VALIDATE_<getIncome>
    cmp IP0, IP1
    mov IP1, SP
    csel IP1, IP1, xzr, eq
    mov SP, IP1
    b pensioner_getIncome pensioner_getIncome:
    ...
```

Class Pensioner
{
    int getIncome()
    {
        ...
    }
}

FIG. 14c

INDIRECT CONTROL FLOW INSTRUCTIONS AND INHIBITING DATA VALUE SPECULATION

This application is the U.S. national phase of International Application No. PCT/GB2019/050722 filed Mar. 14, 2019 which designated the U.S. and claims priority to GB Patent Application No. 1806638.1 filed Apr. 24, 2018, and GB Patent Application No. 1811151.8 filed July 6, 2018, the entire contents of each of which are hereby incorporated by reference.

The present application cites "SPECULATION WITH INDIRECT CONTROL FLOW INSTRUCTIONS" invented by Richard Earnshaw, Kristof Beyls, James Greenhalgh, and Scott Douglass and assigned to Arm Limited, filed on 6 Jul. 2018 as GB1811154 the contents of which are incorporated herein by reference.

The present technique relates to data processing. In particular, the present technique has relevance to the field of speculative execution.

Speculative execution is a technique in which a series of instructions are executed before it is known whether those instructions should be executed. At some later point in time, it is determined whether the speculatively executed instructions should have been executed. If so, the process continues. If not, then the execution is "rewound". This form of speculation is called control flow speculation. In some cases, such speculative execution has been found to cause security leaks. For instance, a processor could be made to speculatively execute privileged code to unnecessarily load secured data into a cache. Since, after a rewind, a cache may not be cleared, the requested data could be probed using side-channel attacks. Another form of speculation is data value speculation where the resulting value produced by an instruction is speculated before all inputs to the instruction are known.

The present technique recognises that there is a desire to keep data secure where control flow speculation occurs.

Viewed from a first example configuration, there is provided an apparatus comprising: input circuitry to receive input data; output circuitry to output a sequence of instructions to be executed by data processing circuitry; and generation circuitry to perform a generation process to generate the sequence of instructions using the input data, wherein the sequence of instructions comprises an indirect control flow instruction comprising a field that indicates where a target of the indirect control flow instruction is stored; the generation process causes at least one of the instructions in the sequence of instructions to store a state of control flow speculation after execution of the indirect control flow instruction; and the at least one of the instructions in the sequence of instructions that stores the state of control flow speculation is inhibited from being subject to data value speculation by the data processing circuitry.

Viewed from a second example configuration, there is provided an apparatus comprising: means for receiving input data; means for outputting a sequence of instructions to be executed by data processing circuitry; and means for performing a generation process to generate the sequence of instructions using the input data, wherein the sequence of instructions comprises an indirect control flow instruction comprising a field that indicates where a target of the indirect control flow instruction is stored; the generation process causes at least one of the instructions in the sequence of instructions to store a state of control flow speculation after execution of the indirect control flow instruction; the at least one of the instructions in the sequence of instructions that stores the state of control flow speculation is inhibited from being subject to data value speculation by the data processing circuitry.

Viewed from a third example configuration, there is provided a method comprising: receiving input data; outputting a sequence of instructions to be executed by data processing circuitry; and performing a generation process to generate the sequence of instructions using the input data, wherein the sequence of instructions comprises an indirect control flow instruction comprising a field that indicates where a target of the indirect control flow instruction is stored; the generation process causes at least one of the instructions in the sequence of instructions to store a state of control flow speculation after execution of the indirect control flow instruction; the at least one of the instructions in the sequence of instructions that stores the state of control flow speculation is inhibited from being subject to data value speculation by the data processing circuitry.

Viewed from a fourth example configuration, there is provided a readable storage medium comprising a computer program produced according to the above method.

The present technique will be described further, by way of example only, with reference to embodiments thereof as illustrated in the accompanying drawings, in which.

Figure 5A:
Figure 5B:
Figure 5C:
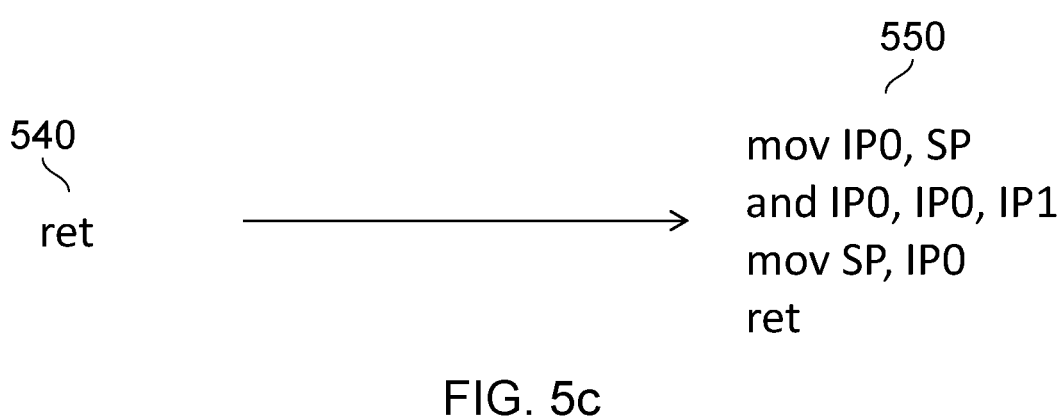
Figure 6:
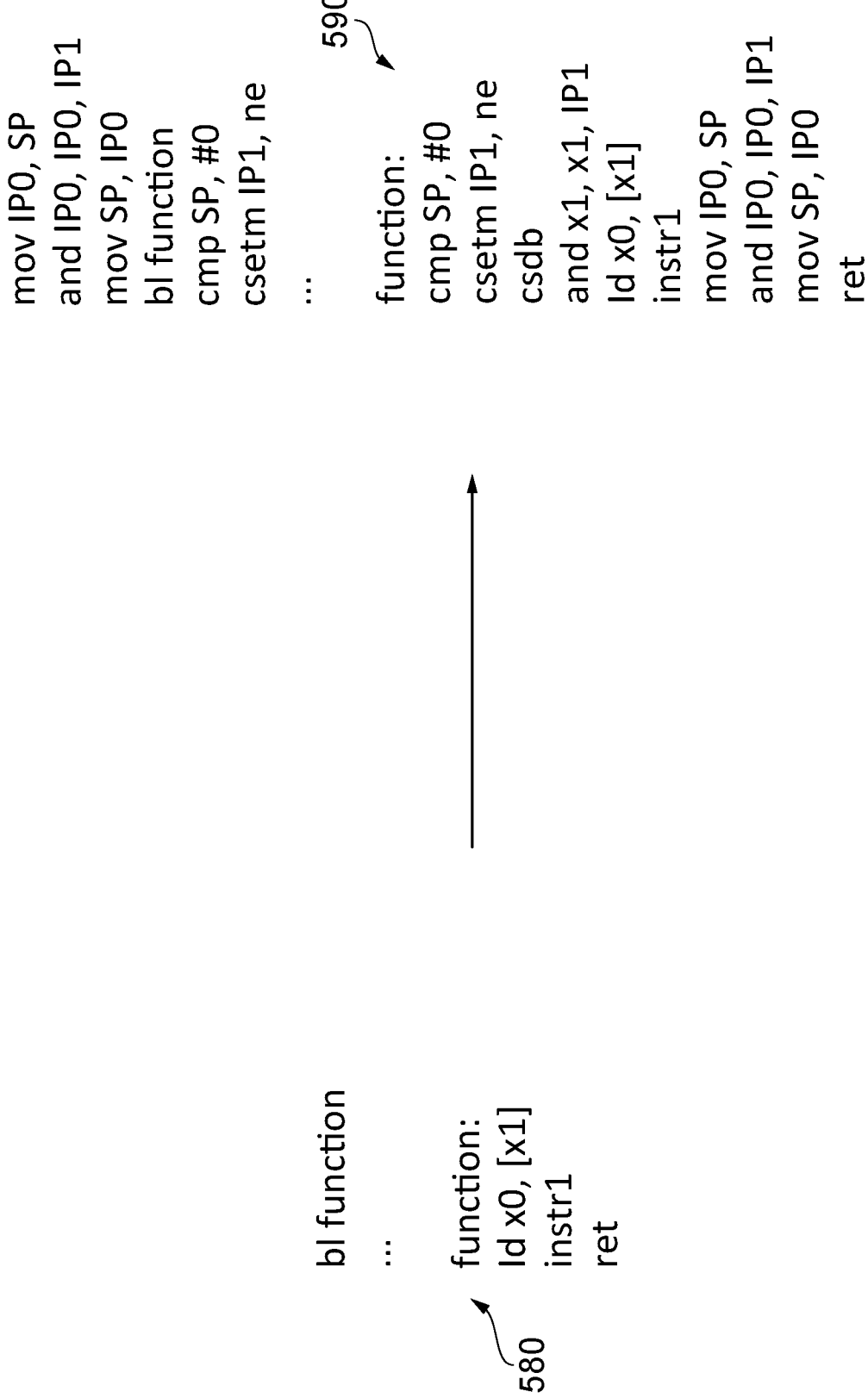
Figure 7:
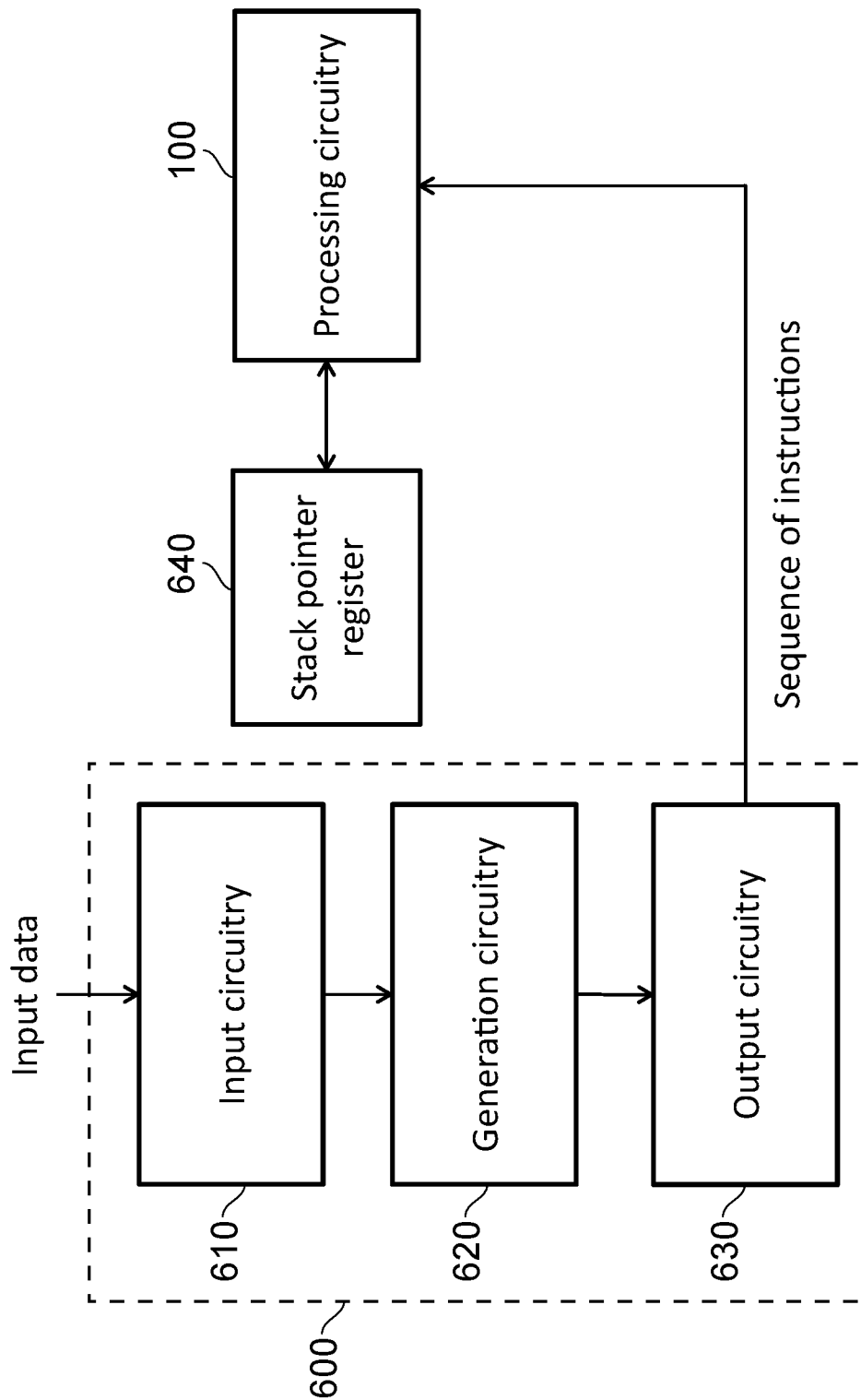
Figure 8:
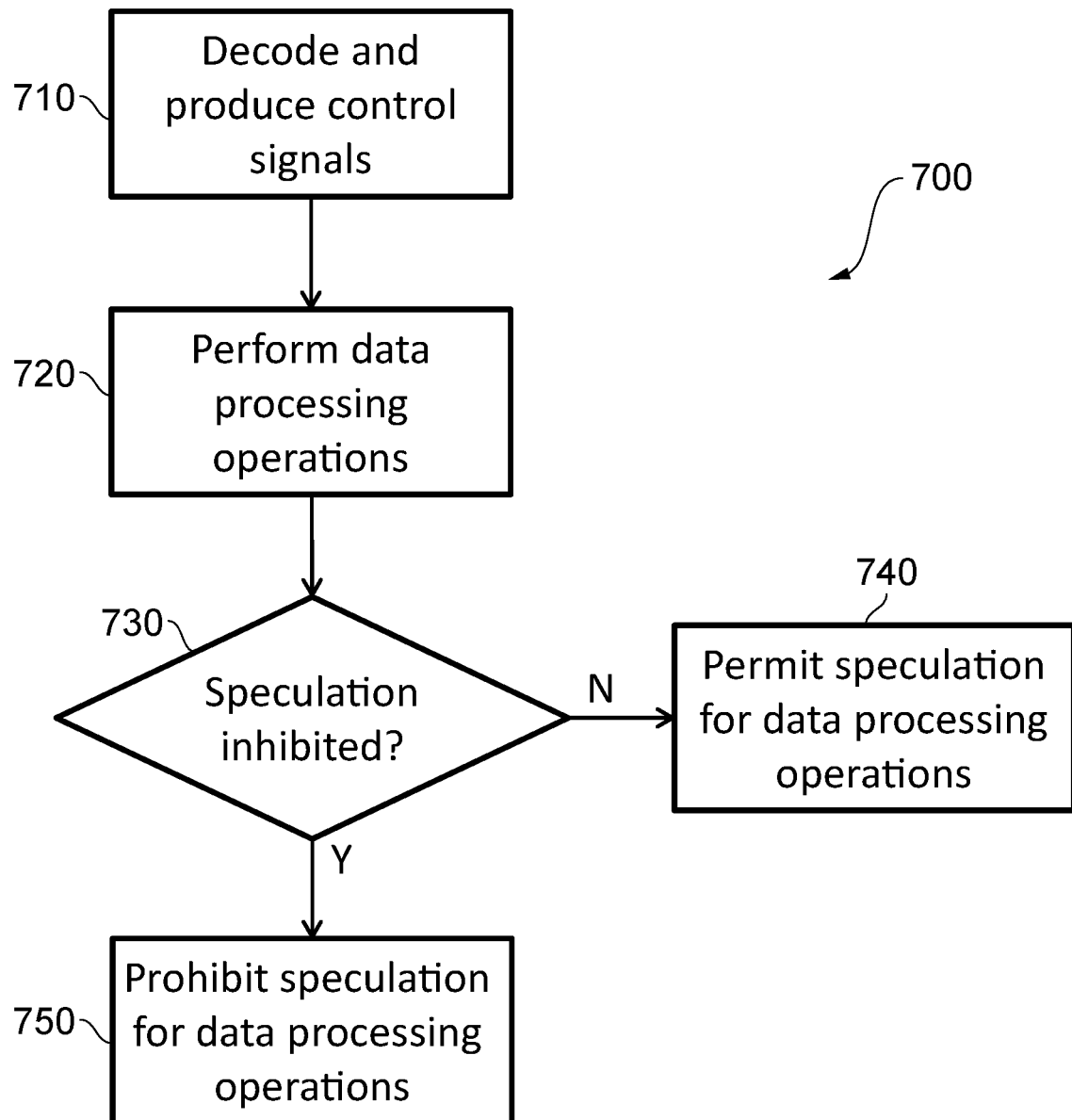
Figure 9:
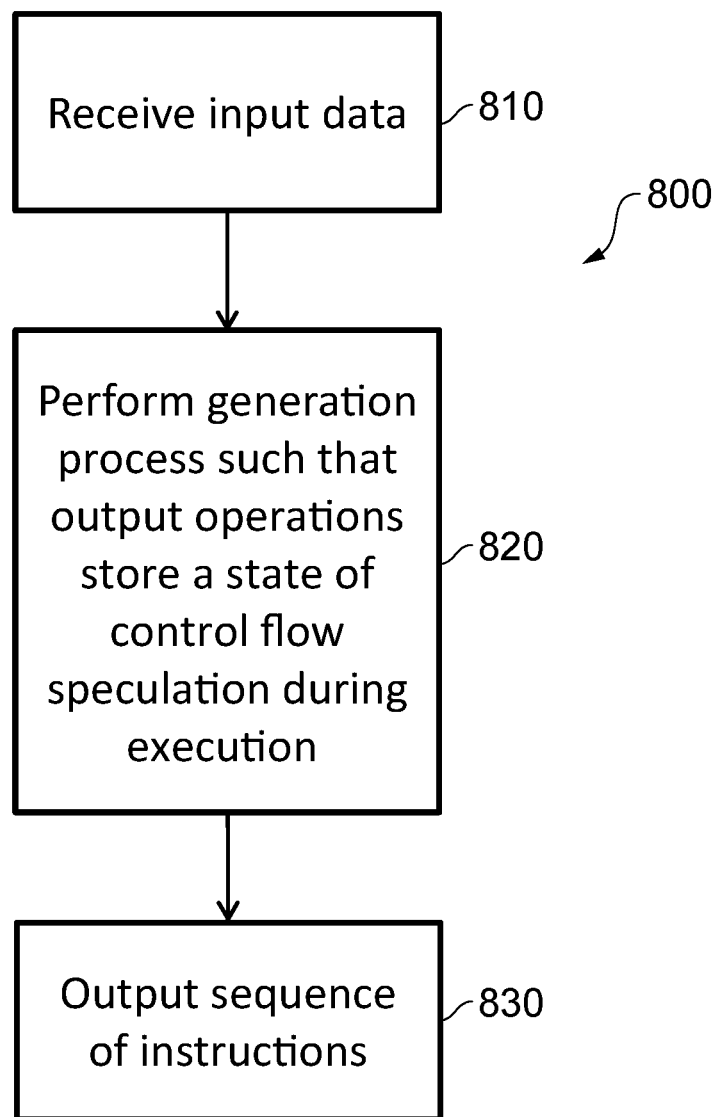
Figure 11:
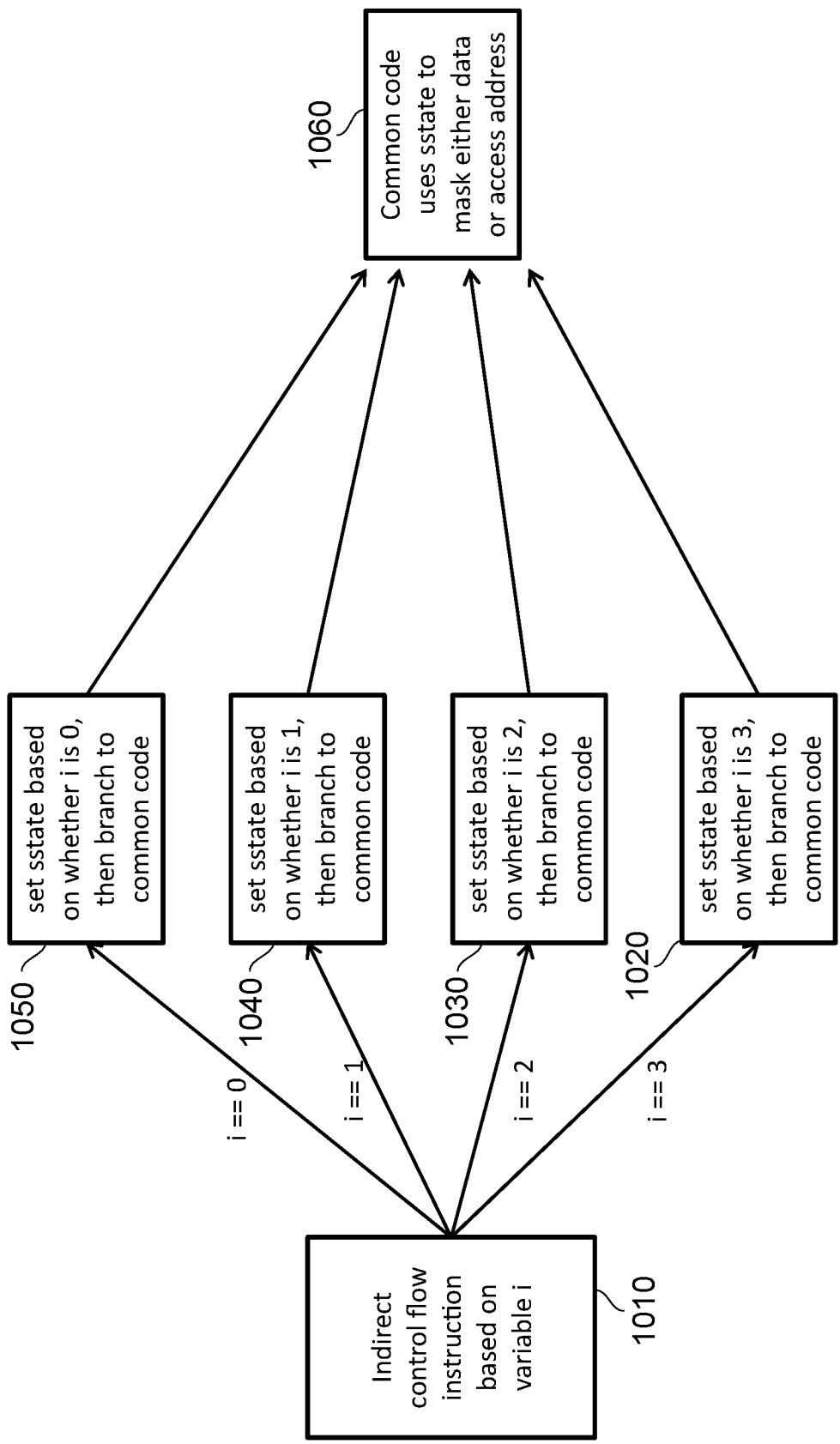
Figure 12:
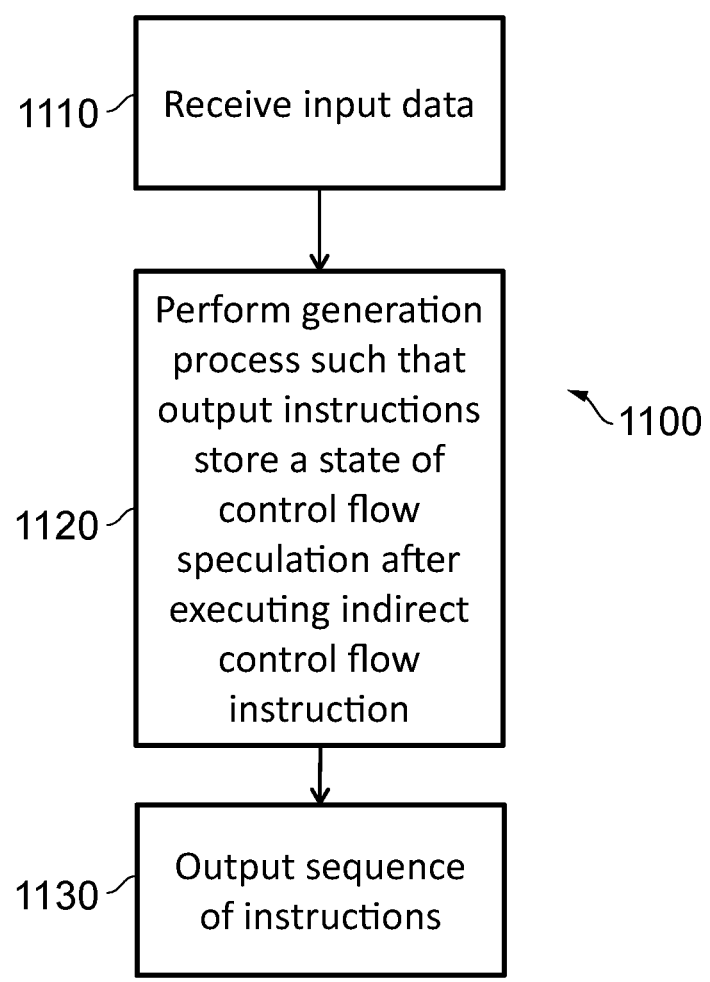
Figure 13A:
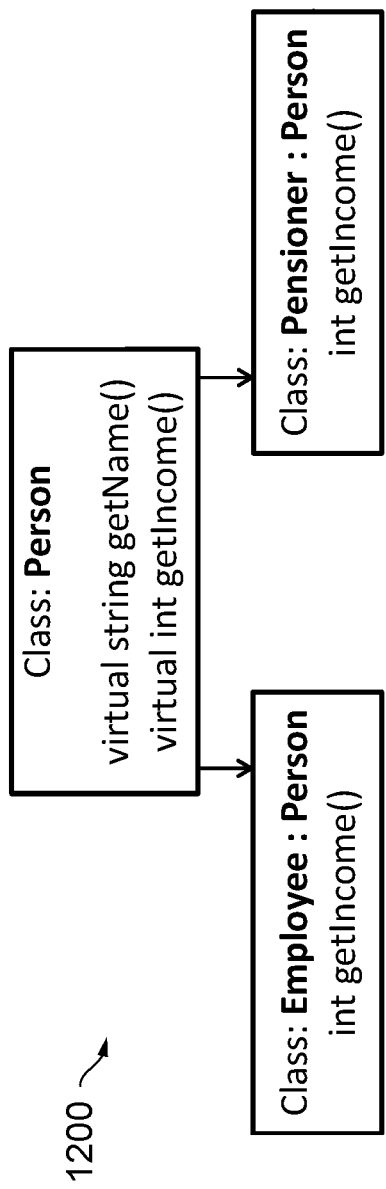
Figure 13B:
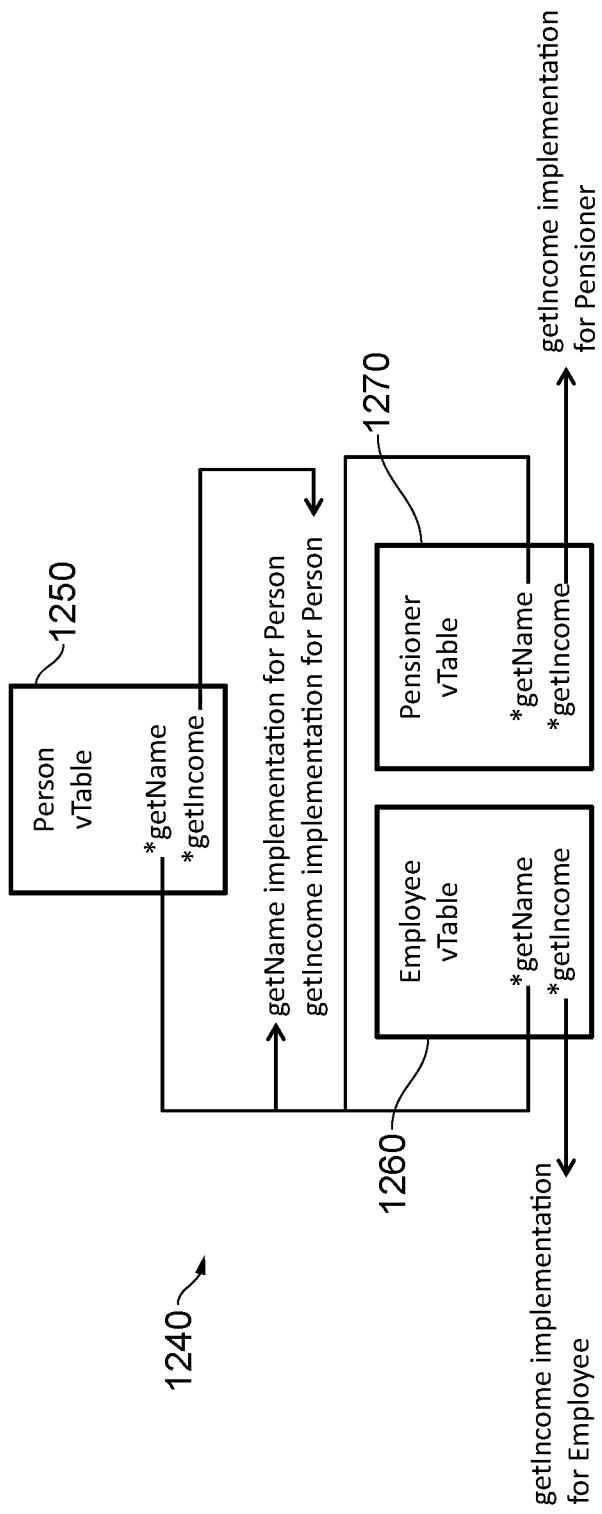
Figure 15A:
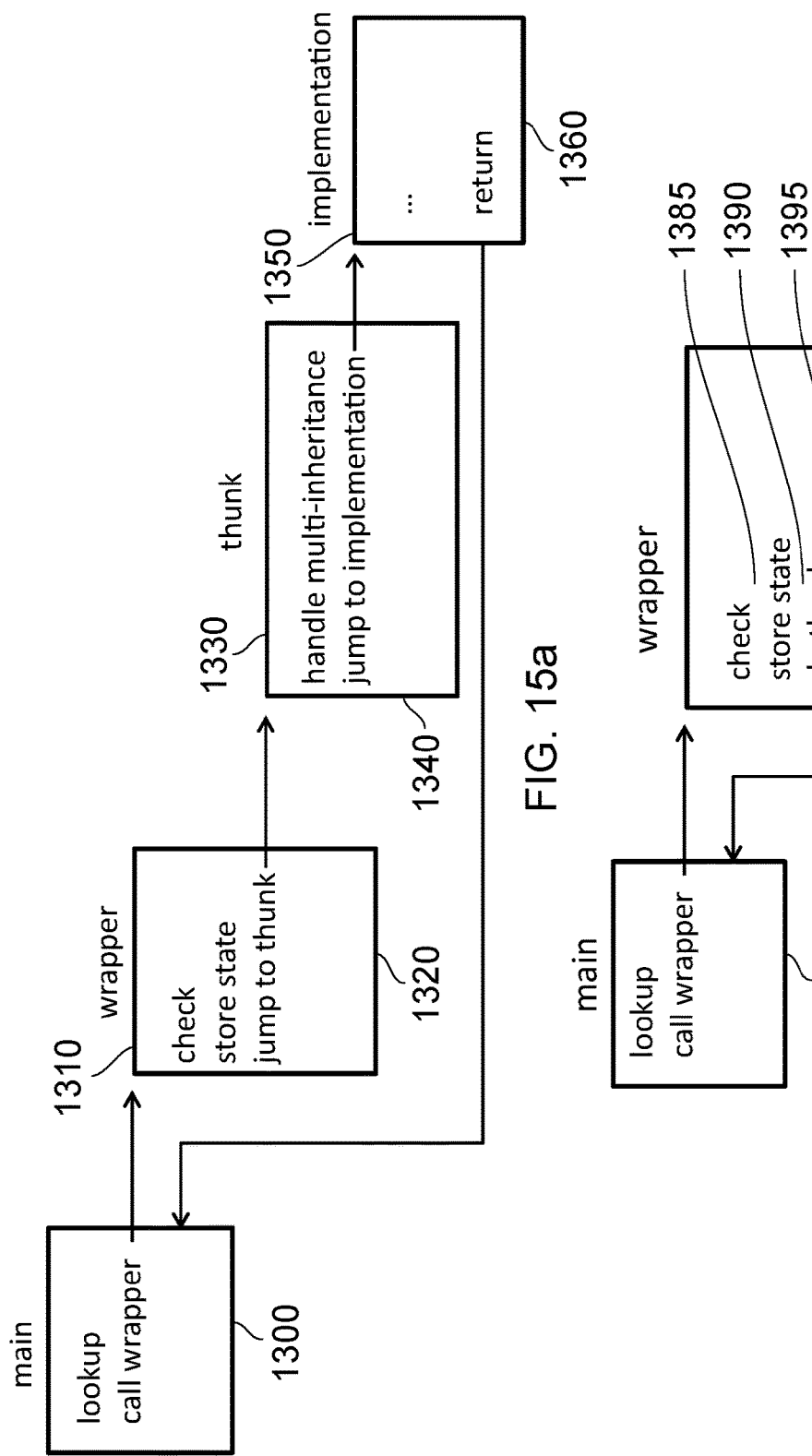
Figure 15B:
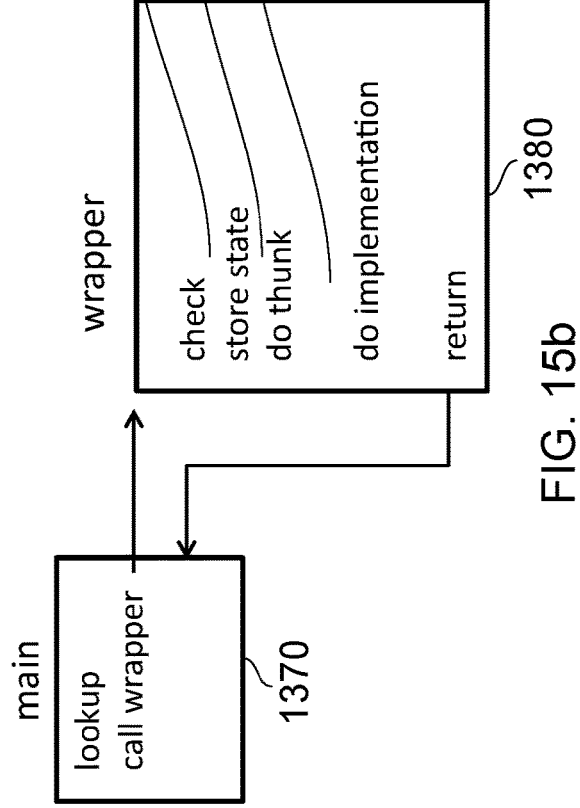
Figure 16:
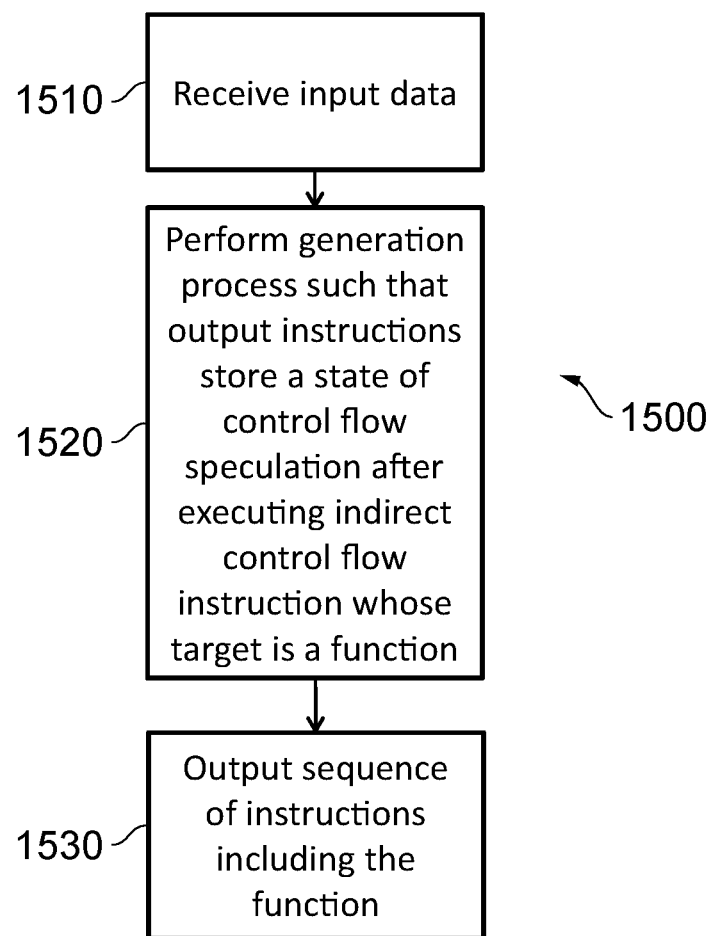

FIGS. 5a, 5b, and 5c illustrate the conversion of input data into a sequence of output instructions containing ABI-compliant control flow miss-speculation tracking across function call boundaries in accordance with some embodiments;

FIG. 6 shows how several techniques involving conversion can be combined;

FIG. 7 illustrates an apparatus in accordance with some embodiments;

FIG. 8 illustrates a method of data processing in flow chart form in accordance with some embodiments;

FIG. 9 illustrates a method of data processing in flow chart form in accordance with some embodiments;

FIG. 10a illustrates the conversion of input data into a sequence of output instructions in accordance with some embodiments;

FIG. 10b illustrates the conversion of input data into a sequence of output instructions in accordance with some embodiments;

FIG. 11 schematically shows the relationship between code blocks in accordance with some embodiments;

FIG. 12 shows a method of data processing in flow chart form in accordance with some embodiments;

FIG. 13a schematically shows an example class hierarchy;

FIG. 13b schematically shows the generation of tables based on the example class hierarchy shown with reference to FIG. 13a;

FIG. 14a illustrates the conversion of input data into a sequence of output instructions in accordance with some embodiments;

FIG. 14b illustrates the conversion of input data into a sequence of output instructions in accordance with some embodiments;

FIG. 14c illustrates the conversion of input data into a sequence of output instructions in accordance with some embodiments;

FIG. 15a schematically shows the relationship between blocks of code with virtual function wrappers and thunks for generating an indicator of control-flow speculation success for virtual function calls in accordance with some embodiments;

FIG. 15b schematically shows the relationship between blocks of code with virtual function wrappers and thunks for generating an indicator of control-flow speculation success for virtual function calls in accordance with some embodiments; and FIG. 16 shows a method of data processing in flow chart form in accordance with some embodiments.

Before discussing the embodiments with reference to the accompanying figures, the following description of embodiments and associated advantages is provided.

In accordance with one aspect there is provided an apparatus comprising: input circuitry to receive input data; output circuitry to output a sequence of instructions to be executed by data processing circuitry; and generation circuitry to perform a generation process to generate the sequence of instructions using the input data, wherein the sequence of instructions comprises an indirect control flow instruction comprising a field that indicates where a target of the indirect control flow instruction is stored; the generation process causes at least one of the instructions in the sequence of instructions to store a state of control flow speculation after execution of the indirect control flow instruction; and the at least one of the instructions in the sequence of instructions that stores the state of control flow speculation is inhibited from being subject to data value speculation by the data processing circuitry.

An indirect control flow instruction could be considered to be one where the instruction does not directly indicate where control flow should go, but instead indirectly indicate this by specifying a location where a control flow parameter (such as an address) can be found. Such apparatus may take the form of a compiler that converts input instructions to output instructions. The input circuitry receives input data and the output circuitry outputs a sequence of instructions that are to be executed by data processing circuitry. The generation circuitry performs a generation process on the input data in order to generate the sequence of instructions. The generation process causes at least one of the instructions that are output to store a state of control flow speculation while the instructions are being executed. These one or more instructions occur after an indirect control flow instruction has been performed, and thus the state of control flow speculation indicates whether control flow speculation has occurred for the indirect control flow instruction. The input data could be translated by the generation process from a first language into a second language that is executable by the data processing circuitry (which could be the processing circuitry itself). In other embodiments, the input data could be in the same language as the sequence of instructions that is output and the generation process could cause additional instructions to be added in order to establish the state of control flow speculation. The inhibition can be achieved by, for instance, the provision of a "speculation barrier", that prohibits speculated data values to be used in further instructions until it has been determined that those speculated data values are correct. As previously explained, data speculation is a technique that is used to estimate the value of data. Consequently, by prohibiting data value speculation from occurring when determining the state of control flow speculation, it is possible to determine whether a branch should actually have been followed or not.

In some embodiments the state of control flow speculation indicates whether control flow speculation occurred correctly. Control flow speculation can occur in the case of a conditional branch instruction, where a branch prediction is made in order to determine whether and to where the branch should be followed in respect of fetching, decoding, and starting to execute further instructions until the outcome of that branch is known. In these embodiments, an instruction is provided that indicates whether the speculation occurred correctly or not.

In some embodiments, the at least one of the instructions in the sequence of instructions that stores the state of control flow speculation is adapted to cause the data processing circuitry to perform a comparison and to store the state of control flow speculation in dependence on a result of the comparison. The comparison is performed in order to determine whether control flow speculation should have caused a branch or not. The state of control flow speculation is then stored so that it can be referred to or used in other calculations elsewhere.

In some embodiments, the input data comprises a multi-target branch instruction and a variable; a target of the multi-target branch instruction is determined based on the variable; and the sequence of instructions comprises, at the target, the at least one of the instructions in the sequence of instructions that stores the state of control flow speculation. A multi-target branch instruction is one that has several possible "targets", which may be expressed as a number of different blocks of instructions that are executed in dependence on the value of the variable. At each "target" in the corresponding sequence of instructions, the state of control flow speculation is stored. The instruction that stores the state of control flow speculation occurs after a branch instruction that may be subject to control flow speculation. Hence, in the event that control flow speculation occurs, it is possible to determine whether the decision to branch (and whether the destination of the branch) was correct or not.

In some embodiments, the target of the multi-target branch instruction is determined by performing a calculation based on the variable; and the comparison logically corresponds with the calculation. It will be appreciated that if the comparison performed by the instruction that determines the state of control flow speculation matches the calculation performed on the variable then the state of control flow speculation matches whether the conditional branch should have been taken or not. Here, the term "logically corresponds with" means that there is an equivalent mapping from input to output for both the calculation and the comparison.

In some embodiments, for each of a plurality of defined possible values of the variable, there is an associated value of the target; and at each target, the comparison determines whether the value of the variable corresponds with the value of the target associated with that target. For instance, when the variable has a first value, the target is a first target, when the variable is a second value, the target is a second target, at the first target, the comparison determines whether the value has the first value, and at the second target, the comparison determines whether the value has the second value. In this way, at each target, the state of control flow speculation can be used to indicate whether that target that was the correct target for which the speculative branch should have occurred.

In some embodiments, a first subset of the defined possible values of the variable have a same associated target; and at the same associated target, the comparison determines whether the value of the variable corresponds with any values of the target associated with the same associated target. In this way, it is not necessary for every possible target of the branch to be unique. Indeed, in some cases, there may be multiple values of the variable for which the target remains the same. In these cases, the comparison is such that it checks whether any of the possible values of the variable that could bring program flow to the current target is held by the variable. This could take the form of a range test (e.g. whether the variable x is between two limits, or whether x is less than one value, or greater than another value), or a comparison against a list of possibilities (e.g. using boolean comparisons), etc.

In some embodiments, a second subset of the defined possible values of the variable have different associated targets; and at each of the different associated targets, if the comparison indicates correspondence then a branch occurs to a common function. In these situations, a unique "wrapper" could be provided for each possible target, with the wrapper performing the necessary determination of the state of control flow speculation. Different common sections of code could then be branched to. This makes it possible to have a plurality of common sections of code.

In some embodiments, in response to the result of the comparison corresponding with the calculation, the state of control flow speculation indicates that control flow speculation occurred correctly.

In some embodiments, at least a subset of the sequence of instructions conform to an Application Binary Interface; and the stored state of control flow speculation is maintained between functions in the sequence of instructions by storing an illegal value in storage circuitry according to the Application Binary Interface. An Application Binary Interface (ABI) dictates how software should use certain elements of hardware. For instance, the ABI may dictate calling conventions (e.g. how different values are to be stored in registers and/or the stack in order to perform a function call or to return from a function call). Accordingly, the ABI may dictate that particular registers should/should not store particular values. Regardless, in such embodiments, despite the ABI being conformed to by at least a subset of the plurality of instructions, an "illegal" (e.g. disallowed) value (according to the ABI) is stored in storage circuitry in order to maintain the state of control flow speculation between functions. In this way, compatibility with existing systems can be maintained, since the presence of an "illegal" value in the storage circuitry should have no effect.

In some embodiments, the illegal value is stored in the storage circuitry in response to the state of control flow speculation indicating that miss-speculation occurred. Since, as a consequence of miss-speculation, a "rewind" would be expected to occur, it may be considered to be acceptable to store an illegal value in storage circuitry until the rewind occurs. Note that in some other embodiments, the reverse may be true, i.e. an illegal value is stored in response to the state of control flow speculation indicating that miss-speculation did not occur.

In some embodiments, the storage circuitry comprises a stack pointer register; and the illegal value is 0. In some ABIs, the stack pointer register, which may be used to point to an address in memory at which the end of the previous stack frame is stored, is not permitted to be 0 across function calls. Accordingly, by storing a value of 0 in the stack pointer register, it is possible to indicate that miss-speculation has occurred. Additionally, since such a value is prohibited from being in the stack pointer register, storing such a value here should have no overall effect.

In some embodiments, the sequence of instructions comprises an access instruction comprising an access address; and correct execution of the access instruction is dependent on the state of control flow speculation. In this way, it is possible to control access to data depending on whether control flow speculation should or should not have happened. In some cases, the correct execution of the access instruction can be considered to be secure, because in this manner it is possible to inhibit the access instruction from being executed in insecure scenarios—such as where control flow miss-speculation has occurred and in which access to a data value is inappropriate. This can help to inhibit privileged data from being leaked, since the data may not actually be retrieved if miss-speculation occurs.

In some embodiments, the sequence of instructions comprises an instruction that performs an operation on either the access address prior to the access instruction or data retrieved from the access address by the access instruction; and the operation is dependent on the state of control flow speculation. By performing an operation on the address or the data that depends on the state of control flow speculation, it is possible to affect the address or the data depending on whether control flow speculation was correct or not. This can make it possible to 'corrupt' an address or the data if access is inappropriate. In this way, either the access does not occur as a consequence of the address being invalidated, or the access occurs but the data is invalidated, making it unusable by other instructions. By invalidating the address, the data itself is not retrieved, which makes it even harder for the data to be accessed inappropriately.

There are a number of ways in which the operation can be performed. In some embodiments, the operation is a logical AND operation comprising an operand; and the operand is 0 in a case where the state of control flow speculation indicates that miss-speculation occurred. Hence, when miss-speculation occurs, the result of performing the AND operation is to effectively 'nullify' (zero) the access address thereby inhibiting the access from occurring. Where miss-speculation has not occurred according to the state of control flow speculation, the operand can be an all 1-s value (e.g. a '1' for each bit stored in the appropriate register) such that an AND with the access address results in the access address itself.

In some embodiments, the indirect control flow instruction is generated via a switch instruction in the input data. A switch instruction is used to indicate a number of different outcomes depending on the value of a variable. For instance, if the variable has one value then one piece of code is executed, if the variable has a second value then another piece of code is executed, and so on. Switch statements are such that it may be possible to specify default code to be executed if none of the cases are met. Furthermore, some outcomes can be grouped together such that if the variable has one of several values, then a piece of code is executed. In some embodiments, switch statements may be compiled using a lookup table that provides a mapping between variable values and branch locations such that the instruction that performs the branch is indirect (a calculation in the form of a table lookup occurs in order to determine the target of the branch).

Particular embodiments will now be described with reference to the figures.

Figure 1:
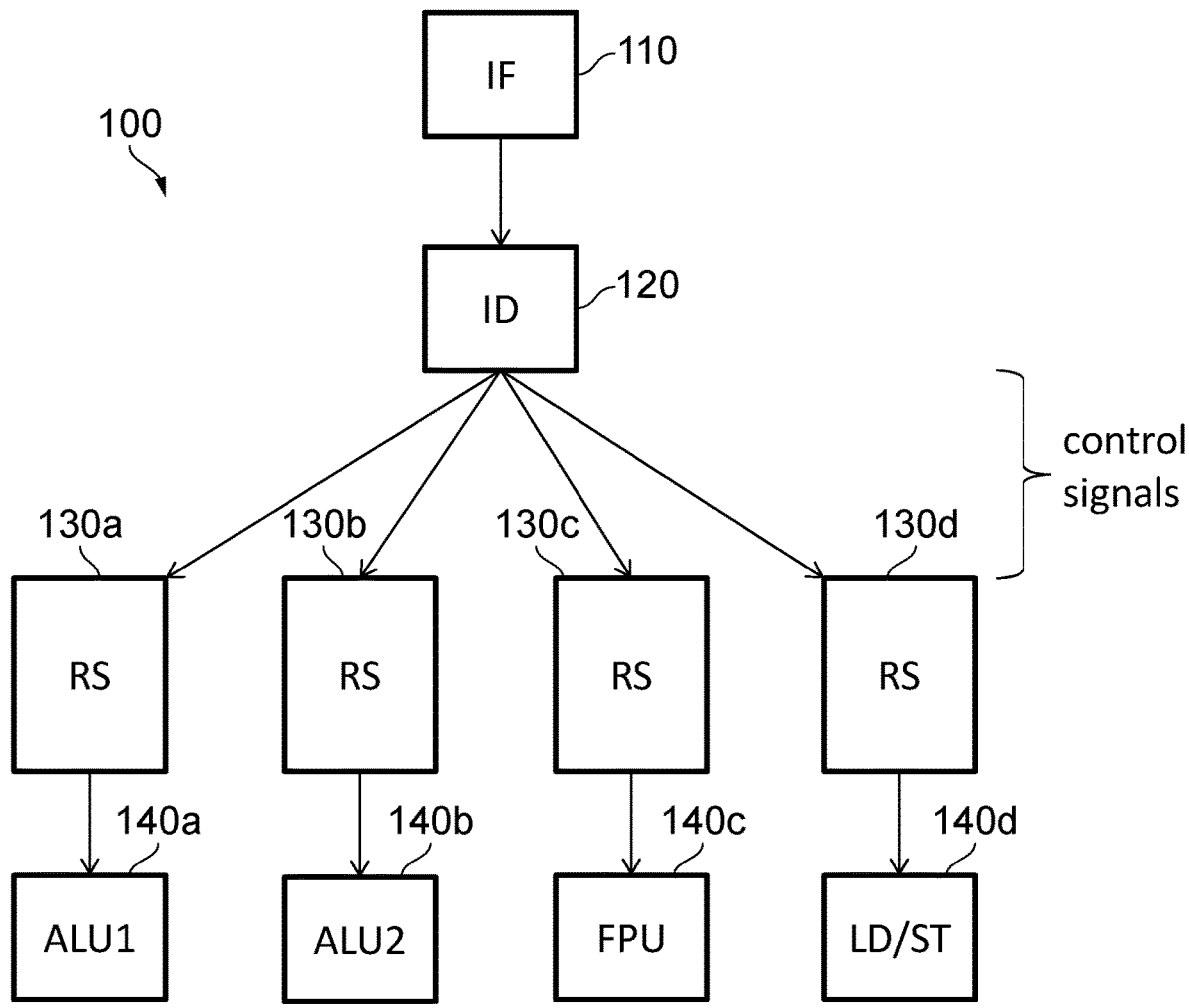
FIG. 1 illustrates an apparatus in accordance with some embodiments.

FIG. 1 illustrates an apparatus 100 in accordance with some embodiments. The apparatus could, for instance, take the form of a pipeline for executing instructions. In the example of FIG. 1, an instruction fetcher 110 is provided. This obtains instructions, e.g. from memory or from an instruction cache, that are to be executed. The instruction fetcher then passes the fetched instruction(s) to an instruction decoder 120, which decodes the fetched instructions and generates one or more control signals for each instruction. The control signals are passed to one or more reservation stations 130a-130d. Each reservation station stores data corresponding to instructions for execution by execution units 140a-140d. Each reservation station 130 acts as a queue in respect of decoded instructions and the decoded instructions in a given reservation station 130a may be handled by the corresponding execution unit 140a in any order. Here, the execution units 140 include two Arithmetic Logic Units (ALUs) 140a, 140b, a Floating Point Unit 140c, and a load/store unit 140d. Decoded instructions are sent to the appropriate execution unit 140. For instance, floating point instructions are sent to the Floating Point Unit 140c via the corresponding reservation station 130c.

Figure 2:
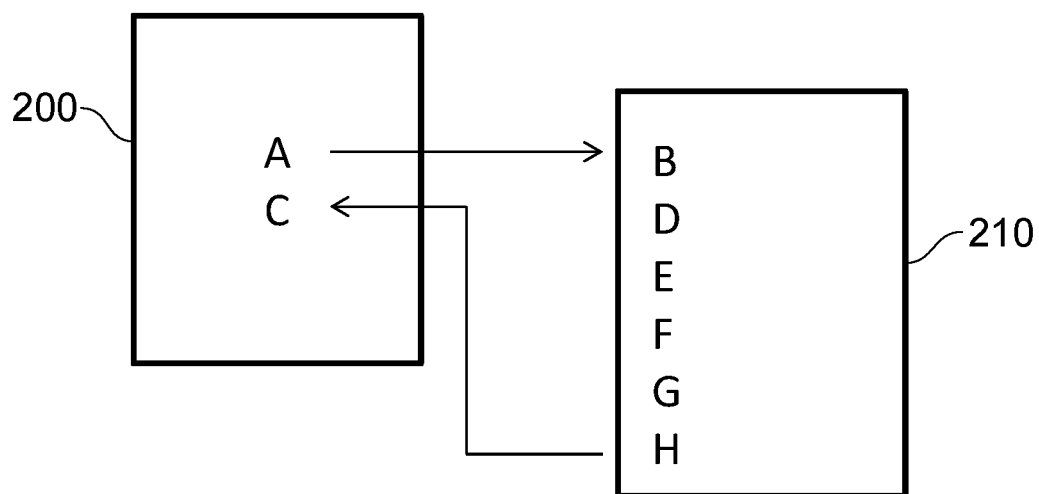
FIG. 2 illustrates the behaviour of a branch instruction and is used to demonstrate one form of speculative execution.

FIG. 2 illustrates the behaviour of a branch instruction and is used to demonstrate one form of speculative execution. In particular, a first group of instructions 200 comprise a branch instruction A. This causes the flow to jump to a second group of instructions 210. In the case of a conditional branch instruction (a branch instruction having a condition associated with it), the branch will only take place if the condition is met. If the branch takes place, then execution will continue at the target of the branch instruction, B. In this example, this involves the execution of instructions D, E, F, G, and H. Instruction H acts as a return instruction, which causes the branch to return. Flow then returns to instruction C in the first block of instructions 200 where execution resumes.

In typical execution, it may take one processor cycle for the instruction fetcher 110 to fetch an instruction and a further processor cycle for the instruction decoder to decode the instruction. The instruction may then wait in a reservation station 130 until the necessary data has been obtained. For instance, if the instruction operates on data in memory then several processor cycles may be spent retrieving the data from memory. A further processor cycle might be spent actually performing the instruction at the execution unit 140 once the instruction has been passed on. In order to maintain efficiently, typical data processing systems will continue to operate (e.g. fetch, decode, and execute) other instructions at the same time. A conditional branch instruction can theoretically cause a problem here because it is not known, until the condition is actually evaluated, which instructions should next be fetched/decoded/executed. In order to help resolve this problem, a branch prediction is made, and it is assumed that the branch will go in one particular direction. Instructions in that direction are then fetched/decoded/executed. If the prediction was correct, then efficiency has been maintained. If not, then a "rewind" occurs and execution resumes from the correct location. In this case, no significant time is lost as compared to the situation where execution merely stops until the branch is executed. This is an example of speculative execution. Consequently, in the example of FIG. 2, when the branch instruction at A is reached, some or all of instructions B-H (and even C if the return instruction at H is executed) may be executed before it is known whether the branch at A should have been followed.

Figure 3:
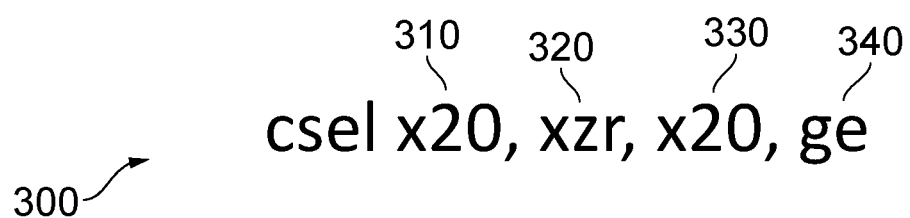
FIG. 3 illustrates an example of a conditional select instruction.

FIG. 3 illustrates an example of a conditional select instruction 300. The instruction comprises a destination 310 (e.g. the register x20), a first source 320 (e.g.

the special register xzr, which always contains the value '0'), a second source 330 (e.g. the register x20) and a condition 340 (e.g. 'ge' indicating 'is the greater than or equal flag set'). The greater than or equal flag may be set as the consequence of a previous instruction comparing two values. Alternatively, in some embodiments, the condition 340 making up the conditional select instruction could include the comparison of two values directly.

The execution of this instruction causes the value 0 (in the xzr register) to be stored in register x20 if the greater than or equal flag is not set. Otherwise (if the greater than or equal flag is set), the value in register x20 is stored in register x20 (i.e. the value of register x20 remains the same). Note that if the condition 340 in the conditional select instruction corresponds with the condition of a conditional branch instruction, then the value stored in register x20 can be made to change depending on whether control flow speculative execution occurred correctly, as illustrated below.

Figure 4A:
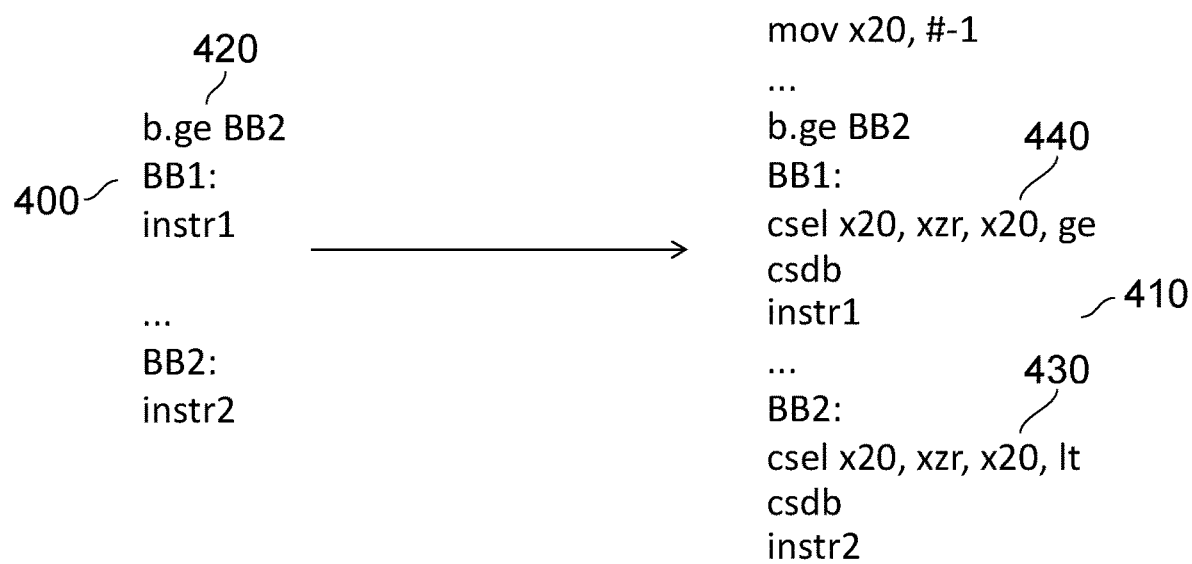
FIGS. 4a and 4b illustrate the conversion of input data into a sequence of output instructions containing data value speculation-limiting instructions, enabling control flow miss-speculation tracking, in accordance with some embodiments.

FIG. 4a illustrates how a conditional select instruction can be used in order to determine whether miss-speculation has occurred by compiling (e.g. converting) an input set of instructions 400 into an output set of instructions 410. Note that the input instructions 400 could be in one language and the output instructions 410 could be in a second language intended for execution on a data processing circuitry 100 such as the one illustrated in FIG. 1.

The input instructions contain a typical conditional branch scenario. In this example, the condition 420 of the branch instruction is that the 'greater than or equal flag' is set. If the condition is met then a branch occurs to target label BB2 (which includes instruction instr2). Otherwise, execution continues at label BB1 (which includes instruction instr1). In the output instructions, register x20 is initially loaded with a value '−1'. The branch then occurs as in the input instructions. At the target label BB2, a conditional select instruction occurs, as previously described with reference to FIG. 3. However, the condition of the conditional select instruction 430 is the inverse of the condition 420 in the branch instruction—relying on the 'lt' ('less than') flag being set. As a consequence, the condition of the conditional select instruction corresponds with that of the condition of the branch instruction because they are each dependent on the same test and simply take different actions depending on the possible outcomes. The remaining instructions of branch BB2 are then executed (including instr2). Similarly, at branch BB1, a conditional select instruction 440 occurs. This code is executed if the branch instruction 420 is not followed. In this case, the condition in the conditional select instruction 440 is the same as that of the branch instruction 420.

In this way, at branch BB1, the value in register x20 will either remain the same ('−1') or will be changed (to '0'). Since the condition 420 in each conditional select instruction 430, 440 is the opposite of the condition in the branch instruction 420 required to reach the target containing that conditional select instruction, the value of the register x20 will only be changed if miss-speculation occurred. Otherwise, the register x20 will remain the same. For instance, assume that speculation occurs at BB2. This will turn out to be correct if the 'ge' flags are set. Here, the conditional select instruction 420 determines whether the 'lt' flags are set. Assuming the 'ge' and 'lt' flags are mutually exclusive, the conditional select instruction 420 will cause the value in register x20 to remain the same (e.g. by moving the value in register x20 to register x20) if the condition in the branch instruction 420 is met (i.e. if speculation occurred correctly) and similarly for the conditional select instruction 440 at BB1. In each case the register x20 will maintain the value '−1' if the branch is correctly speculated. In this example, the CSDB instruction inhibits data value speculation that may happen on the CSEL instruction from being observed by any instructions executing after the CSDB instruction. This causes the value in register x20 to represent the correctness of control flow prediction accurately for instructions executing after CSDB has been executed. The CSDB instruction is a special instruction used to inhibit data value miss-speculation that happened before the CSDB instruction from being seen by instructions executed after the CSDB instruction. Consequently, the actual result of the CSEL instruction is established, rather than being estimated by data-value speculation. Of course, if miss-speculation has occurred then at some future point in time, a "rewind" will occur. However, until that time, it is useful to be aware that control flow miss-speculation has occurred in order to inhibit privileged data from being leaked.

It will be appreciated that in related examples, the change could be made to occur if speculation occurs correctly and remain the same if the branch is miss-speculated. Similarly, it will be appreciated that the specific values (e.g. '0' and '−1') can be arbitrarily selected for each outcome.

Figure 4B:
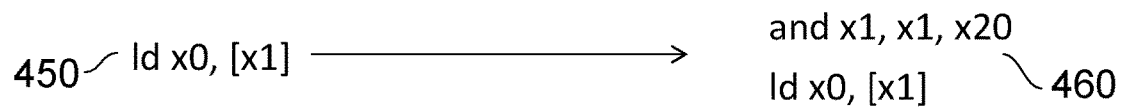

FIG. 4b illustrates how the output produced by the conditional select instruction can be used to protect access to particular data. Here it is assumed that the register x20 contains an indication of whether speculation occurred correctly (all 1s) or incorrectly (all 0s). In the input data 450, a load is made to obtain data stored in memory at a memory address that is stored in register x1. The data is loaded into register x0. Here, the memory address stored in register x1 is considered to contain privileged information, since it relates to secure data. Hence, it is desirable to not have the data loaded in register x0 when control flow miss-speculation is happening—i.e. when the programmer did not intend to load this data. The output data 460 performs a logical AND operation on the memory address in register x1 with the value stored in the register x20. This results in x1 having value 0 in case of control flow miss-speculation, and hence the load loading from address 0 rather than the address of the privileged data.

Finally, the load occurs on the memory address now stored in register x1. If miss-speculation occurred, then the logical AND operation with the all 0s value in register x20 will cause the memory address in register x1 to be erased thereby preventing its access by the load instruction. If speculation occurred correctly, then the logical AND operation leaves the value in register x20 alone thereby allowing it to be accessed by the load instruction. Hence, the load is protected so that it can only occur if speculation was performed correctly.

Note that the CSDB instruction could be placed anywhere between the last CSEL operation on register x20 and the first use of register x20 in the AND instruction in order to protect the load instruction that loads the privileged data.

It is desirable for the indication of whether miss-speculation occurred to persist across function calls. FIGS. 5a, 5b, and 5c show how further translations can be performed in order to enable the miss-speculation indicator to persist across function calls.

In these examples, it is assumed that the output instructions 510, 530, 550 conform to an Application Binary Interface (ABI). This dictates how hardware should be utilised by the underlying software. For instance, it may dictate calling conventions that specify how function calls should be implemented—e.g. the registers that should be used to pass parameters to the called function, how results should be passed back, how and when programme counters and stack pointers should be changed, etc. In the present example, it is assumed (as is often the case) that the ABI prohibits the value '0' from being stored in the stack pointer across functions (e.g. during a call or a return). Hence, by storing the value '0' in the stack pointer, it is possible to provide a backwards compatible system that communicates across functions the fact that either control flow speculation has occurred correctly, or that miss-speculation has occurred. Since this uses a value in a register that is prohibited by the ABI, it should not cause problems with any existing systems. In other words, the presence of the '0' in the stack pointer register should have no effect. The present examples use the value '0' to refer to the fact that miss-speculation has occurred. Furthermore, the present examples use the register IP1 within a function to store a value indicative of whether miss-speculation occurred, as opposed to register x20 as was previously used.

FIG. 5a illustrates how a function call in the input instructions 500 is translated into output instructions 510 that perform a function call. The output instructions move the current stack pointer into a temporary register IP0. A logical AND operation is then performed between the stack pointer value in IP0 and the value of the register IP1 which contains the control flow miss-speculation value (all ones if control flow is being speculated correctly and 0 if control flow is being speculated incorrectly), and the result is stored in the temporary register IP0. This AND operation results in IP0 either containing the value of the stack pointer (in case of correct control flow speculation), or 0 (in case of incorrect control flow speculation). The result is then stored back into the stack pointer. Certain architectures prohibit arithmetic/logical operations taking place on the stack pointer directly. In this example, MOV instructions move the value of the stack pointer to a temporary register to allow it to be altered. On other architectures that allow direct operation on the stack pointer it may be possible to set the value of the stack pointer to 0 when control flow miss-speculation happens directly without needing mov instructions.

The branch-and-link instruction is then performed, which causes an unconditional function call to the label 'callee' to occur. Note that the branch-and-link instruction is not a conditional branch instruction and so miss-speculation does not occur as a consequence of this branch-and-link instruction itself. However, the function containing this branch-and-link instruction could have been entered as a consequence of miss-speculation occurring. The present technique makes it possible to maintain the state of control flow speculation across functions and so in the function that is entered from this branch-and-link instruction, it is known whether miss-speculation (from a previous conditional branch instruction, not shown) has occurred.

FIG. 5b illustrates the behaviour at the callee label. In the input instructions 520, this would merely comprise a label "callee:". In the output instructions 530 that are generated from this (e.g. via compilation or conversion), a comparison is made between the stack pointer and the value '0' followed by a conditional select instruction. This code sequence results in register IP1 containing all zeros when the stack pointer is zero, i.e. when control flow miss-speculation happened. If control flow miss-speculation hasn't happened before this point, the stack pointer will have a non-zero value and this code sequence results in IP1 containing an all-ones value. This way, the value of IP1 has been transferred from before the function call to "callee" into the function "callee" by using the ABI-illegal value '0' in the stack pointer.

FIG. 5c illustrates the behaviour at the return instruction that causes a return from a function call. In the input instructions 540, this would merely comprise the instruction 'ret'. In the output instructions 550 that are generated from this (e.g. via compilation or conversion), the stack pointer is moved into the temporary register IP0. A logical AND operation is then performed on the contents of IP0 and IP1. Finally, the result is moved back to the stack pointer, and the return to the caller occurs. As above, the temporary register IP0 is used in order to perform operations on the value stored in the stack pointer.

Referring back to FIG. 5a, the final two lines of the output instructions 510 indicate what happens at the caller after the return. In particular, the stack pointer is again compared to the value '0'. If the stack pointer equals '0' then a '0' is stored in IP1 (i.e. indicating control flow miss-speculation happened), otherwise an all-ones value gets stored in register IP1 by the CSETM instruction. FIGS. 5a, 5b and 5c combined demonstrate how to communicate the control flow miss-speculation value in register IP1 across function call boundaries, by using an ABI-illegal value for the stack pointer.

FIG. 6 illustrates how several of the techniques can be combined. Here, the input data 580 causes a branch to the label 'function'. At the label 'function', the value held in memory at the address listed in register x1 is then loaded into register x0. The instruction 'instr1' is then executed, before returning. In the output data 590, the register IP1 is again used within functions to represent whether control flow miss-speculation has taken place. This value is passed between functions by placing it into the stack pointer. In the case of miss-speculation occurring, the value in IP1 is '0' and is an all 1s value otherwise. For the stack pointer, the value is '0' when miss-speculation occurs, and the unaltered stack pointer value (which ABI rules prohibit from being '0') otherwise. As before, the stack pointer is moved into register IP0 such that it can be adjusted. It is then ANDed with the current value of IP1 and moved back to the stack pointer. At this stage, the stack pointer will now reflect the state of control flow speculation. The function call (bl instruction) then occurs. At the function 'function', the state of control flow speculation is transferred back to IP1. As before, if control flow speculation has occurred correctly then the access address in register 'x1' remains unchanged, otherwise this value is 'corrupted' thereby preventing the access. The CSDB instruction just before the AND instruction means that the value of IP1 will not be data value (miss) speculated at that point, so that the address in x1 is corrupted when control flow miss-speculation happens. The instruction 'instr1' is then performed. Finally, the state of control flow speculation is stored back into the stack pointer before returning. At the point of return in the calling function, the control flow miss-speculation indication in the stack pointer ('0' for miss-speculation, any non-zero value for correct speculation) is translated back into the register IP1 ('0' for miss-speculation, all-ones for correct speculation), and execution of the remaining instructions continues (shown as '. . .' in FIG. 6).

FIG. 7 illustrates an apparatus 600 for producing output instructions from input data in accordance with some embodiments. The apparatus includes input circuitry 610 that receives the input data (which could be in the form of instructions, perhaps in a different language to the output instructions). The input circuitry passes these instructions to the generation circuitry 620, which generates a sequence of output instructions. The sequence of output instructions are based on the input instructions. In this example, the output instructions will achieve the same effect as the input instructions, but will have further instructions added (with at least some restrictions added on data value speculation) that cause control flow miss-speculation to be tracked in a register, as demonstrated for instance with respect to some or all of FIGS. 4a, 4b, 5a, 5b, and 5c. The output instructions are then output by the output circuitry 630. The sequence of instructions that is output by the output circuitry 630 is designed to be executed on processing circuitry 100. The sequence of instructions is such that, with one particular exception, they implement an ABI. The one exception is that in respect of storage circuitry 640, such as a stack pointer register, a value that is prohibited from being stored in the storage circuitry across a function call is in fact stored in that storage circuitry across a function call in order to represent the fact that miss-speculation occurred (or has not occurred).

FIG. 8 illustrates a method of data processing in accordance with some embodiments. The method is illustrated in the form of a flow chart 700 and may be performed by a data processing apparatus 100 as illustrated in FIG. 1, for instance. At step 710, instructions are decoded and control signals are generated. At a step 720, the control signals are used to perform one or more data processing operations. At a step 730, it is determined whether the control signals corresponding with data processing operations (and therefore the corresponding instructions) were marked in some way as to inhibit data value speculation being performed for those instructions. If not, then speculation is permitted for those data processing operations at step 740. Otherwise, at step 750, speculation is prohibited for those instructions.

FIG. 9 illustrates a method of data processing in accordance with some embodiments. The method is illustrated in the form of a flow chart 800 and may be performed, for instance, using an apparatus 600 as illustrated in FIG. 7. At a step 810, input data is received. At a step 820, a generation process is performed. This may corresponding with some or all of the processes illustrated with respect to FIGS. 4a, 4b, 5a, 5b, and 5c. One or more of the output instructions cause a state of control flow speculation to be stored during execution. Finally, the output of the generation process (a sequence of output instructions) is output at step 830.

FIG. 10a illustrates how the present technique can be used with respect to an indirect control flow instruction. An indirect control flow instruction is one where the target of the control flow instruction must be calculated (e.g. looked up or mathematically determined) rather than forming part of the instruction itself. Part of the reason for such a mechanism is to avoid a complex structure of direct branch instructions. For instance, if a variable must be compared against a plurality of different values and different code executed depending on each comparison then it may take time to execute a series of instructions comparing the variable to the first value, then the second value, then the third value, etc. to determine where the code to be executed can be found. As an alternative to this, a lookup table or calculation can be performed in order to directly determine where the code to be executed can be found. FIG. 10a shows an example of input code 900 include a switch statement. In this case, the switch statement has a variable 'i' and depending on the value of 'i', different code is executed. For instance, if i=0, then the code "x=2; . . . ; break" is executed. If i=1, then the code "x=3; . . . ; break" is executed and so on. Although a code fragment this short is likely to be implemented using direct branch instructions, it could be implemented (and we will assume that for the purposes of this example it is implemented) using indirect control flow instruction 910 in output instructions 920. Here, the indirect control flow instruction 910 takes the form of a "switch <expr>" instruction that jumps ahead in the program a number of lines determined by the expression <expr>. Here, the expression uses a mapping based on the value i and the mapping is such that if i=0 then the program jumps ahead 2 lines, if i=1 then the program jumps ahead 4 lines, 6 lines for 2, and 8 lines for 3. For instance, if i=3 then the program jumps ahead 8 lines and therefore executes "sstate &=-(i==3); x=7; . . . ; break;". The break statement causes the block to be exited.

Unlike the example shown with reference to FIG. 4a, the switch statement is equivalent to performing a number of different comparisons to a variable i with different targets for different outcomes. Consequently, the state of control flow speculation in the output instructions 920 (represented by the variable sstate) is determined based on a different comparison for each target. The comparison at each target "mimics" the comparison in the switch statement that would lead to that target. For instance, the control flow ends up at line 6 when i=1 (causing it to jump ahead four lines from line two). Accordingly, the state of control flow speculation at line 6 is determined by comparing the variable i to see if it is 1. If so, then sstate becomes −1 (all ones). If not, then sstate becomes 0.

As with previous examples, a CSDB instruction can be used later in the process in order to protect a variable that might be vulnerable to, for instance, a side-channel attack. Also as per the previous examples, the value stored in sstate can be used to control access to an access address or data retrieved from that access address (e.g. by performing a logical AND with either of these items and the value of sstate) so that the access address or data value will become zero if sstate indicates that control flow speculation should not have occurred. The value indicating whether control value speculation should have occurred can also be transferred between functions using, for instance, the stack pointer as shown previously.

FIG. 10b illustrates a variant in which a subset of the possible values of i point to the same target. For instance, the input instructions 930 are such that if i is 0 or 1 then it executes the code "x=3; break;", if i is 2 or 3 then it executes the code "x=7; break;". In the output instructions 950, the indirect control flow instruction 940 provides the new revised mapping. However, the comparison performed to determine the state of control flow speculation has been adjusted to check whether the variable is any of the values that lead to the particular target. For instance, the code at line 5 can be reached if i is 0 or 1. Hence, the comparison performed in the code on line 5 sets the state of control flow speculation to −1 (all ones) if i is equal to 0 or 1, and sets it to 0 otherwise. Clearly, other comparisons are also possible. For instance, if any of values 0-3 cause a target to be branched to, then the comparison at that target could check that i is in the range >=0 and <=3.

It will be appreciated that in these examples, the indirect control flow instruction has been represented in pseudo-code. However, it will be clear that the lookup function performed by usemap(<index variable>, <mapping>) could be replicated by means of an indirect branch instruction and a lookup table, as will be known to the skilled person.

Relationships between the variable and the target could be more complicated. FIG. 11 illustrates an example of data flow that allows for virtually any combination of target and variable to be realised. In a block 1010, an indirect control low instruction is executed based on a variable i. Depending on the value of i, a different block 1020, 1030, 1040, 1050 is executed in order to set sstate. Each block then branches to a common code block 1060. In this way, an appropriate comparison can be performed for each possible target, regardless of the complexity of the relationship between the value of the variable and the target.

FIG. 12 illustrates a method in accordance with some embodiments in the form of a flowchart 1100 and may be illustrated using, for instance, an apparatus 600 as illustrated in FIG. 7. At a step 1110, input data is received. At a step 1120, a generation process is performed. This may correspond with the process illustrated in respect of FIGS. 10a, 10b, and 11, with some of the techniques described with reference to FIGS. 4a, 4b, 5a, 5b, and 5c. One or more of the output instructions cause a state of control flow speculation to be stored during execution after executing an indirect control flow instruction. Finally, the output of the generation process (a sequence of output instructions) is output at step 1130.

The present technique can also be used in respect of overridden inherited functions, e.g. with virtual function calls.

FIG. 13a illustrates an example class structure 1200 that might be implemented in an object-oriented programming language, for instance. A base class, Person is provided that implements two overridable functions—getName and getIncome. The class Person has two subclasses—Employee and Pensioner. Both classes override the base method getIncome thereby providing their own implementation of this method. The class structure is such that for an object of type Employee, when the method getIncome is called, the implementation of getIncome that is provided as part of the Employee definition is invoked. When the method getIncome is called on an object of type Pensioner, the implementation of getIncome that is provided as part of the Pensioner definition is invoked. In contrast, since neither class provides an implementation of the getName method, when an object of either class calls the function getName, this results in the getName implementation that is part of the Person class being invoked.

FIG. 13b illustrates the vtable structure 1240 that is generated based on the class structure shown with respect to FIG. 13a. The vtable 1250 generated for a Person object includes a pointer to the base implementations of getName and getIncome respectively. The Employee vtable 1260 includes a pointer to the Person implementation of getName and a pointer to the Employee implementation of getIncome. Meanwhile, the Pensioner vtable 1270 contains a pointer to the getName implementation of Person and to Pensioner's own implementation of getIncome.

A given program may call the getIncome function on a number of different objects of type Person. Due to of the class structure, each object could be of type Person, or could be of type Employee or Pensioner (since these classes are also of type Person due to being subclasses of Person). Consequently, branch prediction circuitry could become trained to branch to a particular address where one implementation of getIncome is provided after a number of objects of exactly the same class are provided. This can lead to control flow mis-speculation when an object belonging to one of the other classes is provided. For instance, if the first few objects are all of type Employee then the branch predictor might be trained to branch to the Employee implementation of getIncome. However, if a next object is of type Pensioner, the trained branch predictor will miss-speculate and branch to the Employee implementation of getIncome rather than to the Pensioner implementation of getIncome.

FIG. 14a illustrates the typical manner in which code is translated to achieve such a virtual function call. Input data containing the function call "person.getIncome( )" may be provided that causes a call to the method getIncome( ) on an object named "person" presumably of type Person. Implicitly, this is equivalent to calling getIncome(person) for the implementation of getIncome provided in respect of the Person class. In practice, the output instructions get the pointer this pointer, which refers to the current instance of the object itself. This is added to the predefined offset of the vtable pointer inside the object. The pointer is then dereferenced and stored in register x1. Effectively, the register x1 therefore stores the address of the vtable for the variable 'person'. The next line then determines the offset of the pointer to the getIncome function, and adds this to the value stored in x1 and stores the result back in x1. The register x1 then stores the location of the getIncome method stored in the vtable of the variable 'person'. Finally, a branch-and-link instruction is called using x1 in order to branch to the location of the implementation of the getIncome method for the variable 'person'.

FIG. 14b shows how this translation can be altered in order to help provide a variable that indicates the state of control-flow speculation in respect of such a function call. This time, instead of determining the pointer to the function getIncome, a pointer to the function "VFUNC_VALIDATE_pensioner_getIncome" is determined. The function "VFUNC_VALIDATE_pensioner_getIncome" is a special function that is generated by the generation process in order to determine the state of control-flow speculation before being passed to the real implementation of the getIncome method.

FIG. 14c illustrates how the implementation of the getIncome method is changed for the generation process. As before, the lookup operation is provided. This determines the address of the vtable, in order to determine the address pointed to by the pointer to the VFUNC_VALIDATE_pensioner_getIncome method of the current variable (referred to by the pointer thisptr). The ADR instruction directly gets the address associated with the function VFUNC_VALIDATE_pensioner_getIncome. These locations are then compared by a CMP instruction. The result of this comparison can then be made the subject of a conditional select instruction CSEL in order to reflect whether control-flow speculation occurred correctly or not (as previously described). Also as previously described the result of this is stored in the stack pointer so that it can be passed between functions. Finally, a branch to the real implementation of pensioner_getIncome is made. Hence, by comparing the function that was intended to be called (which can be determined due to the implicit passing of the 'this' object when the function call is made) with the function that was actually called (which can be determined from the ADR instruction), it is possible to compare whether the function that should have been called was actually called, and hence whether control-flow speculation occurred correctly or incorrectly as a consequence of the virtual function call.

FIG. 15a illustrates how the process can be extended in a situation in which thunks are used to handle multiple inheritance, which is used in several object-oriented languages such as C++. In these cases, the initial lookup and function call are made in a first code block 1300. This leads to a wrapper 1320 being called, which checks whether control-value speculation occurred correctly. This stores a state indicating whether the speculation occurred correctly or not before jumping to the thunk 1340. The thunk 1340 then makes any necessary corrections in order to handle multiple inheritance. Finally, the thunk jumps to the real implementation 1360 of the function. When the implementation 1360 returns, it returns to the main code block 1300. It will be appreciated that there are a number of different entry points. A first entry point 1310 is at the start of the wrapper block 1320. A second entry point 1330 is at the start of the thunk block 1340 and a third entry point 1350 is at the start of the implementation block 1360. Each of the entry points 1310, 1330, 1350 can be used depending on the amount of initialisation to be performed. For instance, if no miss-speculation checking is to be carried out, the second entry point 1330 can be used.

The skilled person will appreciate that the thunk may be omitted in some cases (e.g. if multiple inheritance is not used). In such cases, the wrapper block 1320 would directly jump to the entry point 1350 of the implementation block 1360.

FIG. 15b illustrates another implementation. In this case, rather than providing a full chain, the main code block 1370 calls the wrapper block 1380. This performs the checks and stores the state indicating whether control-flow speculation occurred correctly. This same function then performs the functionality of the thunk 1340. The same function then performs the implementation 1360 before returning to the main code block 1370. In this example, the wrapper block again contains multiple entry points. A first entry point 1385 is provided at the start of the code that stores a state of the control-flow speculation. A second entry point 1390 is provided at the start of the code that handles multiple inheritance. A third entry point 1395 is provided at the start of the code that performs the implementation.

FIG. 16 illustrates a method of data processing in accordance with some embodiments. The method is illustrated in the form of a flow chart 1500 and may be performed, for instance, using an apparatus 600 as illustrated in FIG. 7. At a step 1510, input data is received. At a step 1520, a generation process is performed. This may correspond with the process shown with respect to any of FIG. 14a, 14b, or 14c for instance, and may incorporate some or all of the techniques illustrated with respect to FIGS. 4a, 4b, 5a, 5b, and 5c. One or more of the output instructions cause a state of control flow speculation to be stored during execution after executing an indirect control flow instruction whose target is a function (e.g. a virtual function). Finally, the output of the generation process is output at step 1530.

The apparatus may also be configured in a number of other ways.

In some embodiments, there is provided an apparatus comprising: input circuitry to receive input data; output circuitry to output a sequence of instructions to be executed by data processing circuitry, at least some of the instructions being grouped into functions; and generation circuitry to perform a generation process to generate the sequence of instructions using the input data, wherein the generation process causes at least one of the instructions in the sequence of instructions to store a state of control flow speculation performed during execution of the sequence of instructions; and the stored state of control flow speculation is maintained between the functions. Such apparatus may take the form of a compiler that converts input instructions to output instructions. The input circuitry receives input data and the output circuitry outputs a sequence of instructions that are to be executed by data processing circuitry. The generation circuitry performs a generation process on the input data in order to generate the sequence of instructions. The generation process causes at least one of the instruction that are output to store a state of control flow speculation while the instructions are being executed. This state is maintained between functions, e.g. during function calls and return from function calls. In such cases, it may be possible for the speculation state established in one function to be accessed in another function. The input data could be translated by the generation process from a first language into a second language that is executable by the data processing circuitry (which could be the processing circuitry itself). In other embodiments, the input data could be in the same language as the sequence of instructions that is output and the generation process could cause additional instructions to be added in order to establish the state of control flow speculation.

In some embodiments the state of control flow speculation indicates whether control flow speculation occurred correctly. Control flow speculation can occur in the case of a conditional branch instruction, where a branch prediction is made in order to determine whether the branch should be followed in respect of fetching, decoding, and starting to execute further instructions until the outcome of that branch is known. In these embodiments, an instruction is provided that indicates whether the speculation occurred correctly or not.

In some embodiments, the at least one of the instructions in the sequence of instructions that stores the state of control flow speculation is inhibited from being subject to data value speculation by the data processing circuitry. This can be achieved by, for instance, the provision of a "speculation barrier", that prohibits speculated data values to be used in further instructions until it has been determined that those speculated data values are correct. As previously explained, data speculation is a technique that is used to estimate the value of data. Consequently, by prohibiting data value speculation from occurring when determining the state of control flow speculation, it is possible to determine whether a branch should actually have been followed or not.

In some embodiments, the at least one of the instructions in the sequence of instructions that stores the state of control flow speculation is adapted to cause the data processing circuitry to perform a comparison and to store the state of control flow speculation in dependence on a result of the comparison. The comparison is performed in order to determine whether control flow speculation should have caused a branch or not. The state of control flow speculation is then stored so that it can be referred to or used in other calculations elsewhere.

In some embodiments, the input data comprises a conditional branch instruction comprising a condition and a target to branch to when the condition is met; and the sequence of instructions comprises, at the target, the at least one of the instructions in the sequence of instructions that stores the state of control flow speculation. The instruction that stores the state of control flow speculation occurs after a branch instruction that may be subject to control flow speculation. Hence, in the event that control flow speculation occurs, it is possible to determine whether the decision to branch was correct or not.

In some embodiments, the comparison logically corresponds with the condition. It will be appreciated that if the comparison performed by the instruction that determines the state of control flow speculation matches the condition in the conditional branch instruction then the state of control flow speculation matches whether the conditional branch should have been taken or not. Here, the term "logically corresponds with" means that the condition and the comparison have logical equivalence. This can be established using boolean truth tables, as will be known by the skilled person.

In some embodiments, in response to the result of the comparison corresponding with the condition being unfulfilled, the state of control flow speculation indicates that control flow speculation occurred incorrectly.

In some embodiments, at least a subset of the sequence of instructions conform to an Application Binary Interface; and the stored state of control flow speculation is maintained between the functions by storing an illegal value in storage circuitry according to the Application Binary Interface. An Application Binary Interface (ABI) dictates how software should use certain elements of hardware. For instance, the ABI may dictate calling conventions (e.g. how different values are to be stored in registers and/or the stack in order to perform a function call or to return from a function call). Accordingly, the ABI may dictate that particular registers should/should not store particular values. Regardless, in such embodiments, despite the ABI being conformed to by at least a subset of the plurality of instructions, an "illegal" (e.g. disallowed) value (according to the ABI) is stored in storage circuitry in order to maintain the state of control flow speculation between functions. In this way, compatibility with existing systems can be maintained, since the presence of an "illegal" value in the storage circuitry should have no effect.

In some embodiments, the stored state of control flow speculation is maintained within at least some of the functions by storing a legal value according to the Application Binary Interface. In some embodiments, the legal value is stored in the same storage circuitry that the illegal value is stored in, between functions. However, in some embodiments, the legal value is stored in different storage circuitry within a function.

In some embodiments, the illegal value is stored in the storage circuitry in response to the state of control flow speculation indicating that miss-speculation occurred. Since, as a consequence of miss-speculation, a "rewind" would be expected to occur, it may be considered to be acceptable to store an illegal value in storage circuitry until the rewind occurs. Note that in some other embodiments, the reverse may be true, i.e. an illegal value is stored in response to the state of control flow speculation indicating that miss-speculation did not occur.

In some embodiments, the storage circuitry comprises a register. For example, in some embodiments, the storage circuitry comprises a stack pointer register; and the illegal value is 0. In some ABIs, the stack pointer register, which may be used to point to an address in memory at which the end of the previous stack frame is stored, is not permitted to be 0 across function calls. Accordingly, by storing a value of 0 in the stack pointer register, it is possible to indicate that miss-speculation has occurred. Additionally, since such a value is prohibited from being in the stack pointer register, storing such a value here should have no overall effect.

In some embodiments, the sequence of instructions comprises an access instruction comprising an access address; and correct execution of the access instruction is dependent on the state of control flow speculation. In this way, it is possible to control access to data depending on whether control flow speculation should or should not have happened. In some cases, the correct execution of the access instruction can be considered to be secure, because in this manner it is possible to inhibit the access instruction from being executed in insecure scenarios—such as where control flow miss-speculation has occurred and in which access to a data value is inappropriate. This can help to inhibit privileged data from being leaked, since the data may not actually be retrieved if miss-speculation occurs.

In some embodiments, the sequence of instructions comprises an instruction that performs an operation on the access address prior to the access instruction; and the operation is dependent on the state of control flow speculation. By performing an operation on the address that depends on the state of control flow speculation, it is possible to affect the address depending on whether control flow speculation was correct or not. This can make it possible to 'corrupt' an address if access is inappropriate, such that the access does not occur, thereby preventing the data from being retrieved.

There are a number of ways in which the operation can be performed. In some embodiments, the operation is a logical AND operation comprising an operand; and the operand is 0 in a case where the state of control flow speculation indicates that miss-speculation occurred. Hence, when miss-speculation occurs, the result of performing the AND operation is to effectively 'nullify' (zero) the access address thereby inhibiting the access from occurring. Where miss-speculation has not occurred according to the state of control flow speculation, the operand can be an all 1-s value (e.g. a '1' for each bit stored in the appropriate register) such that an AND with the access address results in the access address itself.

Another way of protecting data is to perform an operation on the data itself after having been retrieved. Hence, in some embodiments, the sequence of instructions comprises an instruction that performs an operation on data retrieved from the access address by the access instruction; and the operation is dependent on the state of control flow speculation. Again, for instance, in some embodiments, the operation is a logical AND operation comprising an operand; and the operand is 0 in a case where the state of control flow speculation indicates that miss-speculation occurred. Consequently, having retrieved the data, it is immediately affected by the AND operation that nullifies (zeros) the data if it is indicated that miss-speculation occurred.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
input circuitry to receive input data;
output circuitry to output a sequence of instructions to be executed by data processing circuitry; and
generation circuitry to perform a generation process to generate the sequence of instructions using the input data, wherein
the sequence of instructions comprises an indirect control flow instruction comprising a field that indicates where a target of the indirect control flow instruction is stored;
an instruction in the sequence of instructions is configured to store a state of control flow speculation after execution of the indirect control flow instruction;
a result of the instruction in the sequence of instructions that stores the state of control flow speculation is not subject to data value speculation by the data processing circuitry;
the input data comprises a multi-target branch instruction and a variable;
a target of the multi-target branch instruction is based on the variable; and
the sequence of instructions comprises, at the target, the instruction in the sequence of instructions that stores the state of control flow speculation.

2. The apparatus according to claim 1, wherein
the state of control flow speculation indicates whether control flow speculation occurred correctly.

3. The apparatus according to claim 1, wherein
the instruction in the sequence of instructions that stores the state of control flow speculation is adapted to cause the data processing circuitry to perform a comparison and to store the state of control flow speculation in dependence on a result of the comparison.

4. The apparatus according to claim 3, wherein
the target of the multi-target branch instruction is determined by performing a calculation based on the variable; and
the comparison logically corresponds with the calculation.

5. The apparatus according to claim 4, wherein
in response to the result of the comparison corresponding with a result of the calculation, the state of control flow speculation indicates that control flow speculation occurred correctly.

6. The apparatus according to claim 3, wherein
for each of a plurality of defined possible values of the variable, there is an associated value of the target; and
at each target, the comparison determines whether the value of the variable corresponds with the associated value of the target.

7. The apparatus according to claim 6, wherein
a first subset of the defined possible values of the variable have a same associated target; and
at the same associated target, the comparison determines whether the value of the variable corresponds with any of the defined possible values of the variable.

8. The apparatus according to claim 6, wherein
a second subset of the defined possible values of the variable have different associated targets; and
at each of the different associated targets, if the comparison indicates correspondence then a branch occurs to a common function.

9. The apparatus according to claim 1, wherein
at least a subset of the sequence of instructions conform to an Application Binary Interface; and
the stored state of control flow speculation is maintained between functions in the sequence of instructions by storing an illegal value in storage circuitry according to the Application Binary Interface.

10. The apparatus according to claim 9, wherein
the illegal value is stored in the storage circuitry in response to the state of control flow speculation indicating that miss-speculation occurred.

11. The data processing apparatus according to claim 9, wherein
the storage circuitry comprises a stack pointer register; and
the illegal value is 0.

12. The apparatus according to claim 1, wherein
the sequence of instructions comprises an access instruction comprising an access address; and
correct execution of the access instruction is dependent on the state of control flow speculation.

13. The apparatus according to claim 12, wherein
the sequence of instructions comprises an instruction that performs an operation on either the access address prior to the access instruction or data retrieved from the access address by the access instruction; and
the operation is dependent on the state of control flow speculation.

14. The apparatus according to claim 13, wherein
the operation is a logical AND operation comprising an operand; and
the operand is 0 in a case where the state of control flow speculation indicates that miss-speculation occurred.

15. The apparatus according to claim 1, wherein
the indirect control flow instruction is generated via a switch instruction in the input data.

16. A method comprising:
receiving input data;
outputting a sequence of instructions to be executed by data processing circuitry; and
performing a generation process to generate the sequence of instructions using the input data, wherein
the sequence of instructions comprises an indirect control flow instruction comprising a field that indicates where a target of the indirect control flow instruction is stored;
an instruction in the sequence of instructions stores a state of control flow speculation after execution of the indirect control flow instruction;
a result of the instruction in the sequence of instructions that stores the state of control flow speculation is inhibited from being subject to data value speculation by the data processing circuitry;
the input data comprises a multi-target branch instruction and a variable;
a target of the multi-target branch instruction is determined based on the variable; and
the sequence of instructions comprises, at the target, the instruction in the sequence of instructions that stores the state of control flow speculation.

17. A non-transitory readable storage medium comprising the sequence of instructions generated according to the method of claim 16.

* * * * *